United States Patent [19]
Myers

[11] Patent Number: 5,690,202
[45] Date of Patent: Nov. 25, 1997

[54] OVERRUNNING CLUTCH MECHANISM

[76] Inventor: John E. Myers, 14305 Mt. McClellan St., Reno, Nev. 89506

[21] Appl. No.: 633,959

[22] Filed: Apr. 15, 1996

[51] Int. Cl.$^6$ .................................................. F16D 41/12
[52] U.S. Cl. .......................... 192/46; 192/45; 74/577 R; 74/577 M; 74/578; 188/82.7
[58] Field of Search .................... 192/46, 45; 74/577 R, 74/577 M, 578; 188/82.7, 82.77

[56] References Cited

U.S. PATENT DOCUMENTS

| | | | |
|---|---|---|---|
| 436,246 | 9/1890 | Lee et al. | 192/46 |
| 501,031 | 7/1893 | Surtin | 192/46 |
| 2,226,247 | 12/1940 | Lesage | 192/46 X |
| 3,899,060 | 8/1975 | Clements | 192/67 A |
| 4,049,099 | 9/1977 | Zeigler | 192/46 |
| 4,147,243 | 4/1979 | Segawa et al. | 192/6 A |
| 4,441,315 | 4/1984 | Bochot | 192/45 X |
| 4,629,044 | 12/1986 | Post et al. | 192/28 |
| 4,727,965 | 3/1988 | Zach et al. | 192/6 A |
| 4,838,401 | 6/1989 | Nagano | 192/64 |
| 4,913,500 | 4/1990 | Wauke et al. | 301/105 |
| 4,928,905 | 5/1990 | Granzotto et al. | 242/201 |
| 5,004,083 | 4/1991 | Lohman | 192/5 |
| 5,070,078 | 12/1991 | Pires | 192/45 |
| 5,088,581 | 2/1992 | Duve | 192/46 |
| 5,143,189 | 9/1992 | Meier-Burkamp | 192/46 X |
| 5,257,685 | 11/1993 | Tichiaz et al. | 192/46 |
| 5,573,094 | 11/1996 | Roberts | 192/45 |

*Primary Examiner*—Andrea L. Pitts
*Attorney, Agent, or Firm*—Bielen, Peterson & Lampe

[57] ABSTRACT

An overrunning clutch for a torque converter utilizing a housing having an endless inner surface. A plurality of ratchet teeth are located on the endless inner surface of the housing such that each of the ratchet teeth possess a contact surface. A retainer having an endless outer surface fits within the inner surface of the housing. A series of recesses on the endless outer surface of the retainer hold or confine a plurality of spring actuated sprags. Each of the sprags extends from the recesses to bears on the contact surface of a ratchet tooth on the endless inner surface of the housing. Such contact takes place upon the rotation of the housing relative to the retainer.

10 Claims, 2 Drawing Sheets

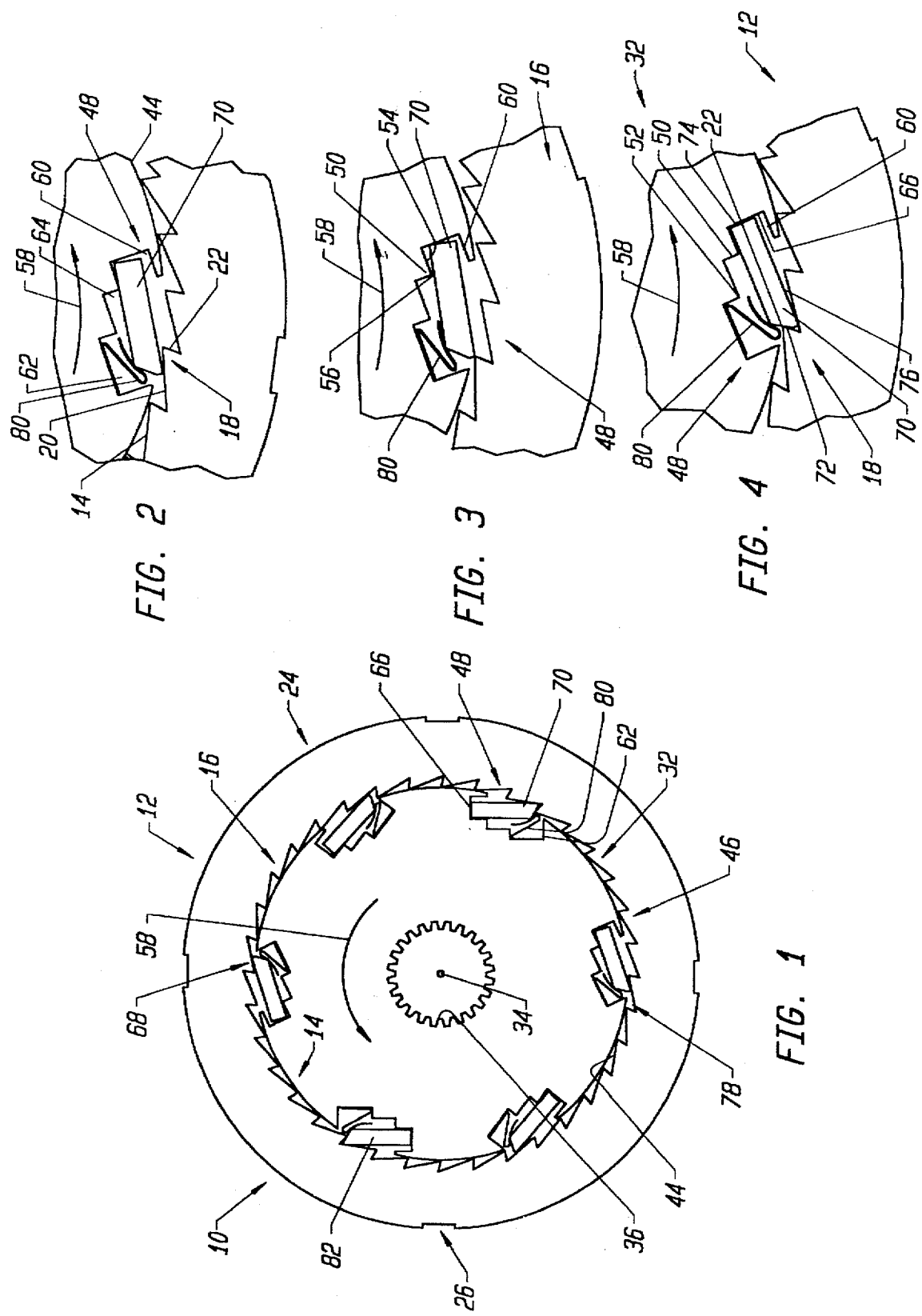

OVERRUNNING CLUTCH MECHANISM

BACKGROUND OF THE INVENTION

In accordance with the present invention a novel and useful torque converter clutch mechanism is herein provided.

Torque converter clutches are employed in automatic transmissions. During start-up of an automatic transmission in a vehicle, the torque converter clutch freewheel is restrained. The force restraining the clutch is produced by the difference between the engine torque and the output torque of the transmission. At the end of start-up, these torques equalize such that the transmission stator rotates along with the turbine. Thus, the torque converter is fluidly coupled.

In the past, overriding torque converter clutches were constructed in a grip roller format such that the grip rollers jam into narrow gaps in the clutch when the thrusting force of the stator acted in one direction. Likewise, when the thrusting force decreases or reverses its direction the rollers are released allowing the collar of the freewheel or clutch to rotate freely. Although effective in certain instances, it has been found that the grip roller structure for an overriding clutch has a tendency to wear excessively.

Many other clutch mechanisms have been proposed. For example, U.S. Pat. Nos. 4,629,044 and 4,928,905 show clutch mechanisms in which a lifting arm or pawl is engagable in a recess between a clutch hub and a clutch sleeve.

U.S. Pat. Nos. 4,838,401 and 4,913,500 describe unidirectional transmission mechanisms for bicycles that employ ratchet pawls in pairs that are generally spring loaded to engage ratchets. The pawls simply rotate about a pivot point.

U.S. Pat. Nos. 4,049,099; 4,147,243; 4,727,965; 5,004,083; and 5,088,581 describe one-way clutches that employ a multiplicity of pawls that are spring loaded to engage ratchet teeth about an outwardly encircling ratchet ring.

U.S. Pat. No. 3,899,060 describes a pawl and ratchet mechanism using a rotatable spring-loaded pawl that is dampened by a liquid chamber.

U.S. Pat. No. 5,070,978 shows a one-way drive device that employs driving and driven planar faces, normal to the axis of rotation, that are coupled to one another and utilize a plurality of cooperating pawls, each having a shoulder that is capable of engaging the ratchet teeth in the form of pockets. The drive device rotates a driven member only in one direction.

A torque converter clutch mechanism which is reliable and durable would be a notable advance in the automotive arts.

SUMMARY OF THE INVENTION

In accordance with the present invention a novel and useful torque converter clutch mechanism is herein provided.

The mechanism of the present invention utilizes a housing having an endless inner surface. The endless inner surface of the housing also provides a plurality of ratchet teeth each possessing a contact surface. The housing may also include a housing surface that is adapted to engage a stator in a torque converter.

A retainer is also employed in the present invention and includes an endless outer surface of a predetermined size to fit within the endless inner surface of the housing. The retainer outer surface possesses a plurality of cavities each having a wall portion and an associated edge which extends outwardly from the retainer cavity. In certain embodiments, one pair of the retainer cavities may lie generally opposite to one another on the endless outer surface of the retainer. The retainer is rotatable relative to the housing.

A plurality of sprags or pawls are located in each of the plurality of cavities of the retainer. Each sprag includes a contact surface which extends from the retainer cavity. The sprags also pivot on the edge associated with the cavity wall portion from the retainer. A notch may be formed in each cavity to also at least contain a portion of the sprag which is generally based within the cavity. The notch may further possess a contact surface for bearing on a portion of the sprag located in the cavity when the sprag contact surface bears on the ratchet tooth contact surface.

Spring means is found in the present invention for urging each of the plurality of sprags from each of the plurality of retainer cavities. When urged in this manner, the sprag contact surfaces bear on each of the ratchet tooth contact surfaces of the housing. Such contact between the sprag and the ratchet teeth occurs during the rotation of the housing relative to the retainer. The spring means is located in each cavity of the retainer, and may be specifically located within an indentation within each of the retainer cavities. The spring indentations may lie adjacent the sprag holding notches. In certain cases, a hiatus may exist between the sprag notch and the spring indentation within the retainer cavity.

The retainer may also possess a central keyed bore to accept a splined rotational shaft. Of course, the rotational member may be part of an automotive torque converter. In addition, the housing would then rotate with the retainer in one rotational direction through engagement of the sprags with the ratchet teeth as heretofore described. The retainer and the housing may rotate about a common axis in this regard.

It may be apparent that a novel and useful torque converter clutch mechanism has been described.

It is therefore an object of the present invention to provide a torque converter clutch mechanism which includes locking pawls or sprags that greatly reduce slippage.

Another object of the present invention is to provide a torque converter clutch mechanism which is amenable for use in racing vehicles.

Another object of the present invention is to provide a torque converter clutch mechanism which is reliable under severe motoring conditions.

A further object of the present invention is to provide a torque converter clutch mechanism which is lightweight and sturdy for use in automotive environments.

The invention possesses other objects and advantages especially as concerns particular characteristics and features thereof which will become apparent as the specification continues.

BRIEF DESCRIPTION OF THE DRAWINGS

FIG. 1 is a top plan view of the present invention.

FIG. 2 is an enlarged plan view depicting the movement of a locking sprag relative to a ratchet tooth prior to engagement.

FIG. 3 is an enlarged plan view showing the position of a locking sprag relative to a ratchet tooth just prior to engagement.

FIG. 4 is an enlarged plan view of the present invention depicting a sprag engaging a ratchet tooth.

Figure 5:
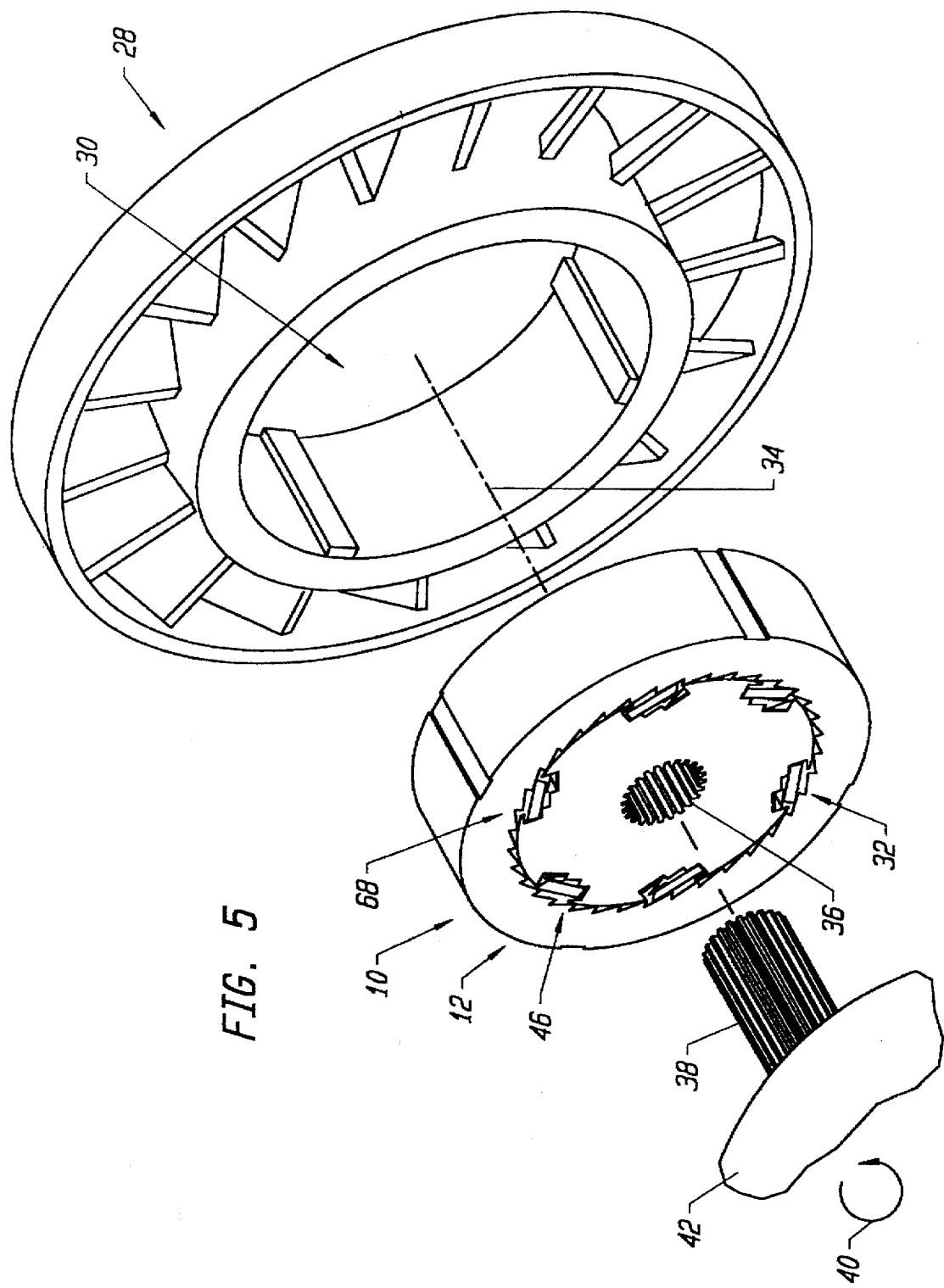
FIG. 5 is an exploded perspective view showing the interaction between the torque converter of the present invention and a rotating shaft and a stator.

For a better understanding of the invention reference is made to the following detailed description of the preferred embodiments thereof which should be referenced to the prior described drawings.

DETAILED DESCRIPTION OF THE PREFERRED EMBODIMENTS

Various aspects of the present invention will evolve from the following detailed description of the preferred thereof which should be referenced to the prior described drawings.

The invention as a whole is depicted in the drawings by reference character 10. The torque converter clutch 10 includes as one of its elements a housing 12 which is generally ring-shaped. Housing 12 includes an inner endless surface 14 which possesses a plurality of ratchet teeth 16. The ratchet teeth 16 are evenly spaced from one another. Moreover, each ratchet tooth, such as exemplary ratchet tooth 18, FIG. 2, includes a cam surface 20 and a contact surface 22. Housing 12 also includes an outer surface 24 possessing a plurality of slots 26 which are capable of engaging a stator 28, FIG. 5, normally found in a torque converter. Specifically, plurality of ridges 30 fit within slots 26 in this regard.

Retainer 32 also comprises an element of the present invention. Retainer 32 is generally circular and is capable of rotating about axis 34, which is concentric to retainer 32 as well as housing 12. Retainer 32 is formed with a keyed bore 36 that immediately surrounds axis 34. Keyed bore 36 is intended to engage splined shaft 38, which represents a rotating shaft turning according to directional arrow 40. Element 42, shown partially, represents the turbine associated with a torque converter. Both retainer 32 and housing 12 may be formed of any suitable materials such as metal composites and the like.

Retainer 32 is constructed with an endless outer surface 44 which is generally circular. Endless outer surface 44 possesses a plurality of cavities 46 which extend around endless outer surface 44 of retainer 32. In the embodiment found in FIGS. 1 and 5, retainer 32 includes six cavities. However, it should be noted that any number of cavities may be formed therealong. FIGS. 2–4 represent an exemplary cavity 48. Cavity 48 includes a pair of protuberances 50 and 52. Protuberance 50 includes a wall portion 54 and an edge 56, FIG. 3. Directional arrow 58 represents the relative movement between housing 12 and retainer 32, FIGS. 1–4. Cavity 48 is specifically constructed with notch 60, indentation 62, and hiatus 64 between notch 60 and indentation 62. It may be apparent that this structure is formed by protuberances 50 and 52 which extend outwardly from cavity 48. Notch 60 possesses a contact surface 66 which will be further described as the specification continues.

Clutch 10 also possesses as one of its elements, a plurality of sprags 68. Sprags 68 may also be designated as pawls, dogs, and the like. Exemplary sprag 70, FIGS. 2–4 possesses a contact surface 72 which extends from recess 48 and a contact surface 74 which lies within notch 60, FIG. 4. Contact surface 72 forms an acute angle with surface 76 of sprag 70, FIG. 4.

Spring means 78 is also found in the present invention for urging each of the plurality of sprags 68 from each of the plurality of retainer cavities 46. With reference to exemplary sprag 70, FIGS. 2–3, leaf spring 80, within indentation 62, serves as spring means 78 for urging sprag 70 outwardly from cavity 48, rotatably about edge 64, such that contact surface 72 of sprag 70 bears on contact surface 22 of ratchet 18. Such engagement is depicted in FIG. 4. Turning again to FIG. 1, it may be noted that sprags 70 and 82, are generally oppositely arranged on outer surface 44 of retainer 32, and simultaneously engage ratchet teeth 16 of housing 12. Likewise, the remaining sprags of plurality of sprags 68 are not in engagement with ratchet teeth 16, but will engage such ratchet teeth in opposite pairs as retainer 32 rotates relative to housing 12. At the same time that contact surface 72 of sprag 68 bears on contact surface 22 of ratchet tooth 18, contact surface 74 firmly bears against the floor surface 66 of notch 60, FIG. 4. Such engagement of sprags 70 and 82 prevents retainer 32 from traveling relative to housing 12 when turned in a direction opposite to the rotation depicted by directional arrow 58.

In operation, torque converter clutch 10 is installed relative to spline shaft 38 of turbine 42 and stator 28 within a torque converter. Spline 38 engages keyed bore 36 and permits the relative rotation between retainer 32 and housing 12 when retainer rotates according to directional arrow 58. When turning in this direction, retainer 32 freewheels. Pairs of sprags or pawls 70 and 82 each engage any one of plurality of ratchet teeth 16, ratchet tooth 18 in the case of sprag 70, to prevent turning of retainer 32 relative to housing 12 when retainer rotates in a direction opposite to directional arrow 58. Thus, clutch 10 serves as a one-way clutch which normally "locks-up" when the engine torque and output torque of the transmission of an engine equalize.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A torque converter clutch mechanism; comprising:

a. a housing having an endless inner surface;

b. a plurality of ratchet teeth located on said endless inner surface of said housing, each ratchet tooth possessing a contact surface;

c. a retainer having an endless outer surface of a predetermined size to fit within said endless inner surface of said housing, said retainer outer surface including a plurality of cavities, each retainer cavity having a wall portion and an associated edge extending from said retainer cavity, said retainer being rotatable relative to said housing;

d. a plurality of sprags located in each of said plurality of cavities of said retainer, each of said sprags including a contact surface extending from said retainer cavity, each of said sprags pivoting on said edge associated with each of said retainer cavity wall portions, each of said retainer cavities including a notch formed to contain a portion of said sprag located in said cavity; and e. spring means for urging each of said plurality of sprags from each of said plurality of retainer cavities resulting in the bearing of each of said sprag contact surfaces with a ratchet tooth contact surface of said housing, during the rotation of said housing relative to said retainer, each of said retainer cavities further comprising an indentation being adjacent said notch, said spring means located in each said retainer cavities including a spring member being at least partially positioned within each of said indentations, said edge associated with each retainer wall portion lying between said notch and said indentation.

2. The mechanism of claim 1 in which said spring means comprises a leaf spring.

3. The mechanism of claim 1 in which said each of said sprag contact surfaces forms an acute angle with another surface of each sprag.

4. The mechanism of claim 1 in which said retainer includes a central keyed bore.

5. The mechanism of claim 4 in which said housing endless inner surface and said retainer endless outer surface are concentrically positioned relative to one another about an axis passing through said keyed bore of said retainer.

6. The mechanism of claim 5 in which said housing includes an endless outer surface having engagement means for contacting a stator.

7. The mechanism of claim 1 in which said notch further includes a contact surface for bearing on said sprag located in said cavity when said sprag contact surface bears on said ratchet tooth contact surfaces.

8. The mechanism of claim 1 which further includes an indentation within each of said retainer cavities, said spring means located in each of said retainer cavities being at least partially positioned within said indentation.

9. The mechanism of claim 1 in which said notch and said adjacent indentation are separated from each other by a hiatus.

10. The mechanism of claim 1 in which one pair of retainer cavities lie generally oppositely to one another on said endless outer surface of said retainer and each sprag located in each of said pair of retainer cavities simultaneously engage a ratchet tooth on said endless inner surface of said housing.

* * * * *